Patented Dec. 8, 1936

2,063,029

UNITED STATES PATENT OFFICE 2,063,029

PROCESS FOR PRODUCING METAL PHOSPHATES

John H. Coleman, Elizabeth, N. J., and Francis H. Coleman, Blairsville, Pa.

No Drawing. Application July 31, 1934, Serial No. 737,836

5 Claims. (Cl. 23—105)

This invention relates to the formation of metallic phosphates while using for the production thereof industrial acid liquors frequently so badly contaminated with metals or other impurities as to make them often waste products, and reacting these liquors with various phosphate materials, particularly tri-calcium phosphate.

It is an object of the invention to make use of industrial liquors such as are obtained from the pickling operations of iron and steel works or the drainage water frequently discharged from coal mines or natural liquors. The only requirement necessary is that such liquors should contain mineral acids and metal impurities. If the liquor being used is deficient in mineral acid and contains sufficient of the other impurities required, then free acid may be added so as to secure the requisite reaction.

The usual process now in use is to first make the phosphoric acid by decomposing phosphate rock such as phosphorite, with sulphuric acid. In this process ground phosphate rock is digested with about 30% of $H_2SO_4$ for about five hours. The reaction $$3H_2SO_4 + Ca_3(PO_4)_2 = 2H_3PO_4 + 3CaSO_4$$

produces phosphoric acid of about 30% strength with a large volume of $CaSO_4$, which must be separated from the phosphoric acid. Extensive washing of the $CaSO_4$ on a filter, with consequent dilution of the phosphoric acid is necessary. This involves evaporation to prepare the phosphoric acid for production of the usual phosphate compounds. Decomposition usually averages 90 to 92%.

The phosphoric acid so produced contains many impurities, chiefly $CaSO_4$, fluorine compounds, iron and aluminum phosphates. Usually these have to be removed by complicated steps before the acid is suitable for making phosphate compounds.

To be economical the phosphoric acid must be produced in a relatively concentrated form, hence expensive lead lined equipment is usually necessary, with high initial cost and high maintenance cost.

The liquors which are used in the present process to be described below are impure from the standpoint of metallic contamination and the acids therein are usually very dilute. For most industrial purposes they are worthless because the cost of concentrating the same would be far greater than the value of the materials which could be obtained therefrom. The present invention contemplates making use of such dilute acid liquors in their dilute form and concentrations for example, as low as ½ of 1% $H_2SO_4$ have been found practicable. As above mentioned, the drainage water frequently discharged from coal mines is suitable for the present process. This water is primarily a solution of $Fe_2(SO_4)_3$, but also contains in some cases $H_2SO_4$. If necessary, a small quantity of $H_2SO_4$ may be added to this weak solution and the mixture is thereby capable of decomposing ordinary prosphate rock according to the following reaction:

$$2Fe_2(SO_4)_3 + 3H_2SO_4 + 2Ca_3(PO_4)_2 = \\ 6CaSO_4 + Fe_2(SO_4)_3 + 2FePO_4 + 2H_3PO_4$$

The precipitated $CaSO_4$ may now be separated by settling or filtration. The iron phosphate may then be precipitated by heating, by supersaturation with $Fe(OH)_3$ or by neutralization. By neutralization with an appropriate alkali, all the $P_2O_5$ will be precipitated as $FePO_4$ with a filtrate of the corresponding alkali sulphate, which may be utilized or discarded.

The above reaction, and all others referred to later where ferric iron is used, is best carried out in the presence of metallic iron. This tends to convert part of the ferric sulphate to ferrous sulphate, increases the solubility of iron in the mixture, and restricts the tendency of iron phosphate to precipitate with the calcium sulphate.

It will be noted that while tri-calcium phosphate requires three molecules of $H_2SO_4$ for its decomposition, the present invention requires at the maximum the addition of only half this quantity of free acid, the other half of the $H_2SO_4$ being derived from the ferric sulphate. In many cases it is unnecessary to add any free acid, the natural product coming from the ground having a sufficient quantity of free acid.

Iron phosphate is a valuable product in itself. It is useful for manufacturing rust proofing compounds, or for the production of coagulants in sewage disposal work. It may furthermore be made the raw material for forming other phosphate compounds such as trisodium phosphate, with a by-product of hydrated iron oxide.

These dilute natural acids frequently carry with them other valuable metals, such as aluminum, copper, or zinc which may also be recovered along with the iron phosphate.

A second example of metal bearing acids to be utilized by our invention is the mixture of sulphuric acid and ferrous sulphate resulting from the pickling operations of iron and steel works. This acid is contaminated with ferrous iron to such a degree that it is frequently a total waste. The chemical reactions in this example are as follows:

$$6FeSO_4 + 3H_2SO_4 + 2Ca_3(PO_4)_2 = \\ 6CaSO_4 + 3FeSO_4 + Fe_3(PO_4)_2 + 2H_3PO_4$$

By the separation of calcium sulphate and neutralization, all the $P_2O_5$ may now be precipitated and recovered as $2Fe_3(PO_4)_2$.

Examples cited above are those of sulphates of iron. It should be understood, however, that the invention will apply to other acids and to other metals, and to other forms of phosphates. A mixture of acids may be used to accomplish the same purpose. For example:—

Fe<sub>2</sub>(SO<sub>4</sub>)<sub>3</sub>+3HCL+Ca<sub>3</sub>(PO<sub>4</sub>)<sub>2</sub>=
CaSO<sub>4</sub>+FeCl<sub>3</sub>+FePO<sub>4</sub>+H<sub>3</sub>PO<sub>4</sub>

After filtration and neutralization, we may now recover 2FePO$_4$+alkali chloride.

The invention also applies to a two step reaction in which a partial decomposition of the phosphate material is accomplished by the use of free acid and the reaction completed by the addition of iron salt.

An example of this procedure would be as follows: $3H_2SO_4+2Ca_3(PO_4)_2$. A digestion of this mixture containing a deficiency of $H_2SO_4$ would result in a mixture of $H_3PO_4$ and $CaH_4(PO_4)_2$ and some undecomposed phosphate. As a second step the addition of $2Fe_2(SO_4)_3$ would react with the monocalcium in solution, liberate $H_3PO_4$ and continue the decomposition of the phosphate rock.

It will be noted that in the first example cited above the new process starts with dilute iron sulphate which is by itself incapable of decomposing tricalcium phosphate and forming phosphoric acid. To this is added $H_2SO_4$ equivalent to half the $SO_3$ contained in the iron sulphate. Tricalcium phosphate, digested in this mixture, shows decomposition up to 96%, in a solution as dilute as 1% $H_2SO_4$.

The separation of $CaSO_4$ from this dilute acid is a simple matter, accomplished by settling, and no washing is necessary.

The solution now contains phosphoric acid, iron sulphate and iron phosphate, in such proportions, that on neutralization with soda ash for example, all the $P_2O_5$ will precipitate as iron phosphate, leaving a filtrate of dilute sulphate of soda which may be used, or may be discarded.

It is not intended however, to restrict the use of this invention to dilute solutions. Stronger solutions are practicable, although corrosion increases, and purity decreases with concentration.

For efficient decomposition of phosphate rock, as well as for complete and pure precipitation of iron phosphate dilute solutions are desirable. There is therefore no evaporation involved, and the dilute solutions can be handled in unlined wooden tanks at low initial cost, and low maintenance cost.

The complicated purification steps of the usual sulphuric method are avoided, and a pure concentrated phosphate compound is secured, valuable in itself, and capable of ready conversion into other phosphate compounds, such as sodium phosphate.

As is obvious from the above, the only desideratum necessary is that the waste liquor should contain a dilute mineral acid which is capable of decomposing the phosphates such as tricalcium phosphate. All dilute mineral acids are suitable since all will decompose the particular phosphate mentioned. As examples of mineral acids that may be used, the following may be mentioned: Sulphuric acid, hydrochloric acid, phosphoric acid, etc. As examples of metal impurities or salts that may be made use of, the following are mentioned—ferric sulphate, ferrous sulphate, compounds of the metals in the iron group and many other metals. For instance, aluminum could be substituted for the iron in the above examples with equal facility. Iron and aluminum are of course incidental impurities in the phosphate rock and they constitute one of the troublesome problems in making pure phosphoric acid and phosphate compounds. However, in the process described above these impurities are not only made use of, but their presence in large volume sufficient to precipitate all the $P_2O_5$ is highly desirable.

Various combinations may be utilized for securing the reaction aimed at. For instance, ferric sulphate and sulphuric acid may be used in combination as set forth above, ferrous sulphate may be used with sulphuric acid. Ferric sulphate and hydrochloric acid may be used. Ferrous sulphate and hydrochloric acid is suitable. Ferric sulphate and phosphoric acid may also be used. In addition, ferrous sulphate and phosphoric acid will react with the phosphates and also ferric chloride and hydrochloric acid. This list may of course be considerably enlarged, since as pointed out above, the main essential is only that dilute mineral acids capable of decomposing the phosphate rock or other phosphate should be used and that metals and metal salts be present.

The above description of the invention is not to be construed in a limiting sense, since the examples given are merely illustrative of the invention which is capable of being carried out in numerous ways with various reacting compounds.

We claim:—

1. The process of producing iron phosphates from industrial and natural waste liquors containing very dilute solutions of iron sulphates and a very dilute mineral acid comprising reacting natural tri-calcium phosphate with said waste liquors, then separating the precipitated calcium sulphate, then precipitating the iron phosphate formed and separating the same from the solution.

2. The process of producing iron phosphates from industrial and natural waste liquors containing very dilute solutions of iron sulphates and a very dilute sulphuric acid comprising reacting natural tri-calcium phosphate with said waste liquors, then separating the precipitated calcium sulphate, then precipitating the iron phosphate formed and separating the same from the solution.

3. The process of producing iron phosphates comprising reacting tri-calcium phosphate with the drainage water discharged from coal mines, comprising very dilute sulphuric acid and a very dilute solution of iron sulphates, separating the precipitated calcium sulphate, then precipitating the iron phosphate formed and separating the same from the solution.

4. The process of producing iron phosphates comprising reacting phosphate rock with a liquor resulting from the pickling operations of iron and steel works, comprising very dilute sulphuric acid and a very dilute solution of iron sulphate impurities, then separating the calcium sulphate formed and recovering the iron phosphates.

5. The process of producing iron phosphates comprising reacting phosphate rock with a liquor resulting from the pickling operations of iron and steel works, comprising very dilute sulphuric acid and a very dilute solution of iron sulphate impurities, then separating the calcium sulphate formed, and then neutralizing the solution in order to precipitate the iron phosphates and then recovering said iron phosphates.

JOHN H. COLEMAN.
FRANCIS H. COLEMAN.